(12) United States Patent
Pons

(10) Patent No.: US 12,738,879 B2
(45) Date of Patent: Sep. 15, 2026

(54) SYSTEMS AND METHODS FOR PLANT AND CROP MANAGEMENT AND PROTECTION

(71) Applicant: Diego Pons, Denver, CO (US)

(72) Inventor: Diego Pons, Denver, CO (US)

( * ) Notice: Subject to any disclaimer, the term of this patent is extended or adjusted under 35 U.S.C. 154(b) by 33 days.

(21) Appl. No.: 18/393,241

(22) Filed: Dec. 21, 2023

(65) Prior Publication Data

US 2024/0195345 A1 Jun. 13, 2024

Related U.S. Application Data

(60) Provisional application No. 63/418,129, filed on Oct. 21, 2022.

(51) Int. Cl.
*H02S 20/10* (2014.01)
*G06Q 50/02* (2012.01)
*H02S 40/38* (2014.01)

(52) U.S. Cl.
CPC ............ *H02S 20/10* (2014.12); *G06Q 50/02* (2013.01); *H02S 40/38* (2014.12)

(58) Field of Classification Search
CPC .................... H02S 20/00–10; H02S 40/00–38
USPC ................................................ 136/243–265
See application file for complete search history.

(56) References Cited

U.S. PATENT DOCUMENTS 10,130,047 B2 11/2018 Surany
11,881,809 B2 * 1/2024 Cook ...................... H02S 20/32
2005/0091916 A1 * 5/2005 Faris ...................... A01G 25/00 47/79
2008/0148631 A1 6/2008 Wan
2011/0120523 A1 * 5/2011 Silver .................. F24S 30/452 136/246
2017/0194894 A1 7/2017 Conger
2019/0159407 A1 * 5/2019 Surany .................. F24S 25/617
2022/0149770 A1 * 5/2022 Paulus .................. F03D 9/007
2022/0287249 A1 9/2022 Yehia et al.

FOREIGN PATENT DOCUMENTS

CN 202697389 1/2013
CN 108667409 A * 10/2018 ............. A01M 1/04
CN 209472584 U * 10/2019
CN 112332769 A * 2/2021 ............. F24S 25/12
CN 212677115 U * 3/2021
KR 20110098527 A * 9/2011
KR 10-2047532 11/2019
KR 20220099049 A * 7/2022 .............. A01G 9/16
(Continued)

OTHER PUBLICATIONS

CN-212677115-U English (Year: 2021).*
(Continued)

*Primary Examiner* — Bach T Dinh
(74) *Attorney, Agent, or Firm* — Sheridan Ross P.C.

(57) ABSTRACT

A self-sustaining protective structure is provided for agricultural applications and other settings. Structures and systems of the present disclosure are contemplated as comprising various features including configurable solar panels, sensors, control systems, pest collection and management systems, and other features. The systems are provided to respond to one or more environmental conditions and to deploy and utilize various features based on the environmental conditions.

20 Claims, 4 Drawing Sheets

(56) References Cited

FOREIGN PATENT DOCUMENTS

| | | |
|---|---|---|
| WO | WO 2021/075640 | 4/2021 |
| WO | WO 2024/092286 | 5/2024 |

OTHER PUBLICATIONS

KR-20110098527-A English (Year: 2011).*
CN-209472584-U English (Year: 2019).*
CN-108667409-A English (Year: 2018).*
CN-112332769-A English (Year: 2021).*
KR-20220099049-A English (Year: 2022).*
International Search Report and Written Opinion for International (PCT) Patent Application No. PCT/US2023/085508, dated Mar. 19, 2024, 15 pages.
International Preliminary Report on Patentability for International (PCT) Patent Application No. PCT/US2023/085508, dated May 1, 2025, 9 pages.

* cited by examiner 2
2
2
2
2

SYSTEMS AND METHODS FOR PLANT AND CROP MANAGEMENT AND PROTECTION

This U.S. Non-Provisional patent application claims the benefit of priority from U.S. Provisional Patent Application No. 63/418,129, filed Oct. 21, 2022, the entire disclosure of which is hereby incorporated by reference.

BACKGROUND

Farming and crop yield are issues that impact the lives and health of nearly every human on the planet. Crop yield and farming production have long been impacted by various factors including, but not limited to, environmental conditions, pests, extreme weather events, and soil conditions. Climate change continues to increase risks and challenges to crop production regardless of the specific location of farms and particulars of the crops at issue.

Various configurable solar array solutions are known including, for example, that shown in U.S. Pat. No. 10,130,047 to Surany, which is hereby incorporated by reference in its entirety. Surany, however fails to disclose various features of the present disclosure as shown and described herein.

SUMMARY

There has been a long-felt and unmet need to provide a system that can address the various challenges posed by raising and protecting crops. There further exists a long-felt and unmet need to provide such a system that simultaneously is capable of reducing environmental harms that continually make agriculture more difficult. Accordingly, embodiments of the present disclosure provide for systems that are easily scalable, provide physical protection to plants and crops, comprise on-board photovoltaics, water-storage and water management solutions, pest mitigation systems, and/or sensor devices operable to monitor conditions and control or assist in controlling operations of various features and components of the systems.

In certain embodiments, a field-deployable and self-contained system is provided that is operable to be positioned in an agricultural setting without, for example, being continuously connected to water or electrical infrastructure. Such embodiments comprise a tower or support that houses various components and features to be self-supported and fully functional. The system is contemplated, for example, as comprising a rechargeable battery pack that is operable to receive and store electrical energy from one or more photovoltaic features provided on or in association with the system.

In various embodiments, systems of the present disclosure comprise on-board sensors that are operable to monitor environmental conditions and assist in controlling various functions of the system. Environmental conditions include, but are not limited to, moisture content of a soil, ambient air temperature, humidity, wet-bulb temperature of air, barometric pressure and changes thereto, ultraviolet light intensity, and wind speed, to name a few. The system is further contemplated as comprising a controller (e.g. an on-board controller or a remotely connected controller) that is operable to receive information from the sensor(s) and is further operable to convey information and control certain features. For example, during periods of intense sunlight and elevated ambient air temperature, the system is operable to detect such conditions and deploy one or more retractable photovoltaic panel members to both provide shade and shelter to nearby crops while also advantageously producing electrical energy in a low carbon or carbon free manner. The system is also operable to store and selectively dispense collected rainwater based on prevailing conditions. For example, the system may gather and store rainwater during periods of heavy rain, and selectively dispense the water during drier periods.

Various embodiments of the present disclosure comprise deployable panels. In further embodiments, systems of the present disclosure comprise telescoping towers or trunks wherein the system is operable to be retracted and, for example, stored underground. Such systems may be useful and desirable to protect the system from environmental conditions and/or to stow the system as may be required depending on the particular crop harvesting methods to be employed.

In various embodiments, systems of the present disclosure comprise at least one on-board battery module dedicated to each tower and wherein the at least one on-board battery comprises a dedicated power source for a given tower. In alternative embodiments, however, it is contemplated that photovoltaics are interconnected to additional towers and/or to a main storage facility, the electrical grid, etc. No limitation with respect to the end location or use of the current produced by photovoltaics is provided herewith.

Systems of the present disclosure are contemplated as comprising highly scalable systems. While it is contemplated that a single unit or tower provides various benefits to an operation or owner, a plurality of units are contemplated as being provided and distributed throughout an agricultural operation (for example), with the exact number and distribution of units depending on the size of the farm, type of farm, climate, etc.

Additionally, while various embodiments of the present disclosure contemplate systems and methods that are well suited for agricultural applications, the present disclosure is not limited to such applications. For example, embodiments of the present disclosure are also contemplated as providing benefits to urban environments (e.g. pedestrian walkways, bus stops, etc.), parks, schoolyards, bike lanes, building rooftops, courtyards, golf courses, pools, and various other settings.

Certain embodiments of the present disclosure provide an electromechanical system with the ability to regulate crop temperature and protect the crop from rain, hail, and snow damage, for example. In some embodiments, a system is provided that is constructed of concentric, nested, retractable petal-like solar panels on an elevated structure (e.g., pole, etc.). The petals contain a series of interconnected solar panels to capture solar energy and produce electrical energy to open and close the petals as needed for optimal light exposure or shade for a specific crop (e.g., coffee, sugarcane) and power irrigation pumps. In some embodiments, the collected solar energy is stored in a battery farm to power the device as needed to affect an optimal petal configuration to produce the required level of sun or shade for a specific crop.

In some embodiments, an air mover is provided in communication with systems of the present disclosure. The air mover is contemplated as comprising, for example, a frost fan that is operable to move relatively volumes of air in an agricultural setting to clear moisture from crops and prevent certain frost or freezing events over a short period of time. The air mover is contemplated as being powered by, for example, photovoltaic(s) and battery module(s) also associated with the system.

The retractable component of the device allows farmers to continue their regular soil management (tilting, fertilizing, etc.) without the inconvenience of the electromechanical system obstructing farm equipment. The benefits of producing electrical power through photovoltaics is well known. It is also known that many conventional photovoltaic applications occupy a large amount of land area that is not available for other uses and is also difficult to maintain. Some such applications have been known to be cleared by grazing goats, providing a green solution and a sustainable livestock practice. Such solutions are generally not available in conventional agricultural applications where crops are to be harvested. Embodiments of the present disclosure thus provide a solution as shown and described herein.

Various retractable features of the present disclosure allow the device, or portions thereof, to be partially or fully retracted and protect it from extreme conditions (e.g., hurricanes in tropical regions) when needed, or simply when not in use. The photovoltaics also protect crops from potential mechanical damage from precipitation (e.g., hail or snow) by opening them during storm events. Precipitation collected from the engaged petals can be directed into a water storage vessel inside the structural pole for crop irrigation during drought/extreme weather events.

In some embodiments, systems of the present disclosure comprise a pest mitigation feature. The pest mitigation feature is contemplated as comprising at least one of a pest monitoring system and a pest trap. For example, in some embodiments, a pest attractor (e.g. a UV lamp) is provided along with a trap element (e.g. an alcohol solution). Various pest counting and tracking features are also contemplated, allowing users to monitor, trap, and/or destroy pests that may harm production, spread disease, etc.

In some embodiments, systems and panels of the present disclosure are contemplated as comprising tiltable features. For example, in some embodiments, panels are contemplated as being rotated or tilted based on an angle of the sun so as to maximize both solar production and shade generated by the structure(s).

Operational efficiencies of various embodiments of the present disclosure including, for example, solar power production, water conservation, and higher yields due to crop protection and pest control are contemplated as at least partially offsetting the costs of the system.

In one embodiment, a system for shading and environmental conditions management is provided, the system comprising a central support member comprising a base and a height, and wherein the base is provided at least partially within a substrate, a configurable photovoltaic array, a sensor operable to determine at least one of: ambient air temperature, humidity, moisture content of the substrate, ultraviolet light intensity, precipitation type, precipitation rate, barometric pressure, and wind speed, a controller operable to receive information from the sensor and operable to control the configurable photovoltaic array, and a power module operable to convey power to at least one of the configurable solar array, the sensor, and the controller.

In one embodiment, a method of crop management is provided, the method comprising providing a system for shading and environmental conditions management, the system comprising a central support member comprising a base and a height, and wherein the base is provided at least partially within a substrate; a configurable shading member; a sensor operable to determine at least one of: ambient air temperature, humidity, moisture content of the substrate, ultraviolet light intensity, precipitation type, precipitation rate, barometric pressure, and wind speed; a controller operable to receive information from the sensor and operable to control the configurable photovoltaic array; and a power module operable to convey power to at least one of the configurable solar array, the sensor, and the controller. Data is collected using the sensor, the data being related to at least one ambient air temperature, humidity, moisture content of the substrate, ultraviolet light intensity, precipitation type, precipitation rate, barometric pressure, and wind speed. The data is compared with at least one predetermined value and, based on the comparison, configuring the configurable shading member using power from the power module.

In various embodiments, it is contemplated that systems of the present disclosure comprise machine learning or artificial intelligence features ("AI"). For example, certain embodiments of the present disclosure comprise AI to, for example, operate anticipatory actions, estimate crop survival, optimize yield, and control pest management. The systems and methods of the present disclosure may, for example, collect and gather data related to its own operations, provide such data to generative AI, and utilize that generative AI to initiate and control further functions and actions of the system(s).

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE FIGURES

Those of skill in the art will recognize that the following description is merely illustrative of the principles of the disclosure, which may be applied in various ways to provide many different alternative embodiments. This description is made for illustrating the general principles of the teachings of this disclosure and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosure.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
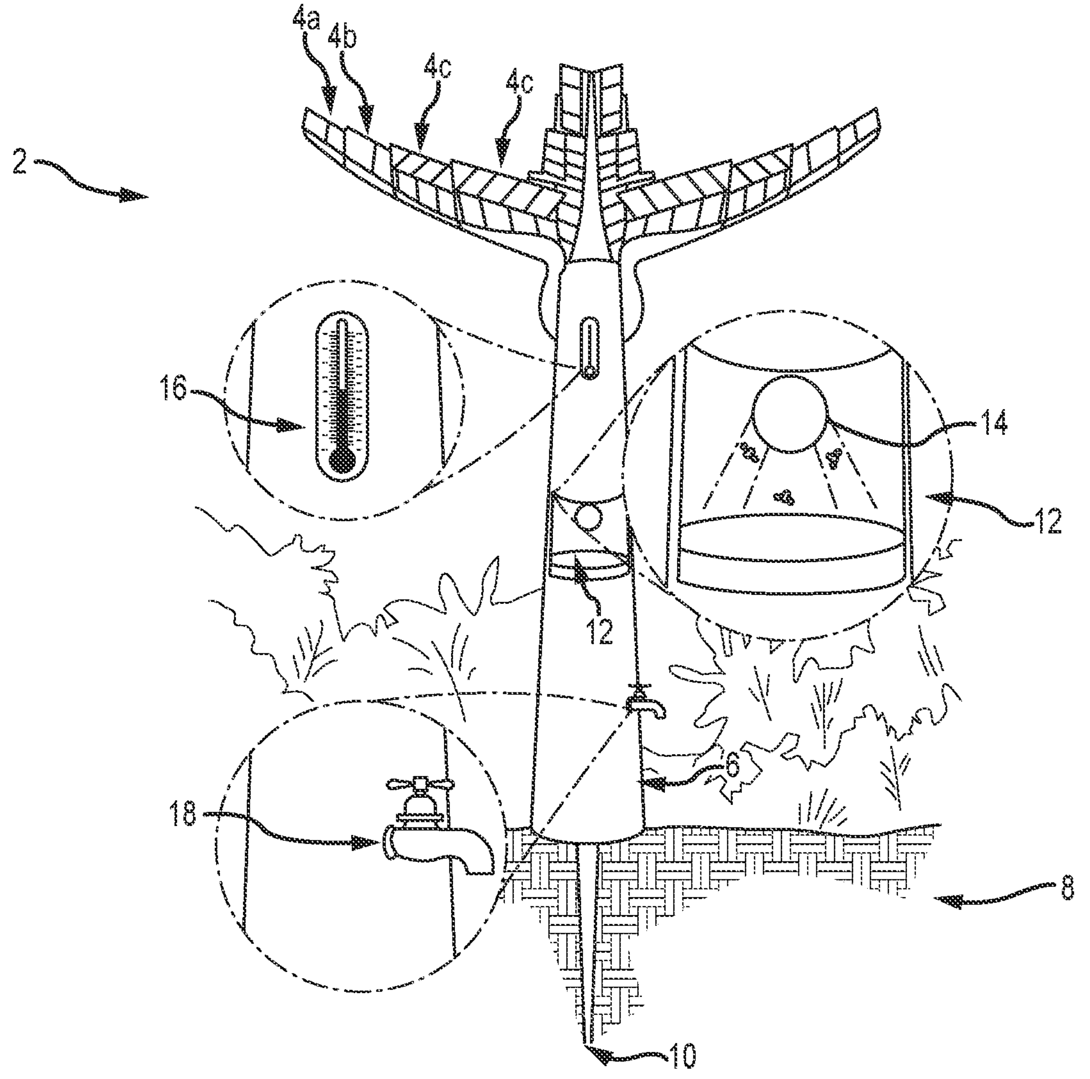

FIG. 1 is an elevation view of a system according to one embodiment of the present disclosure.

Figure 2:
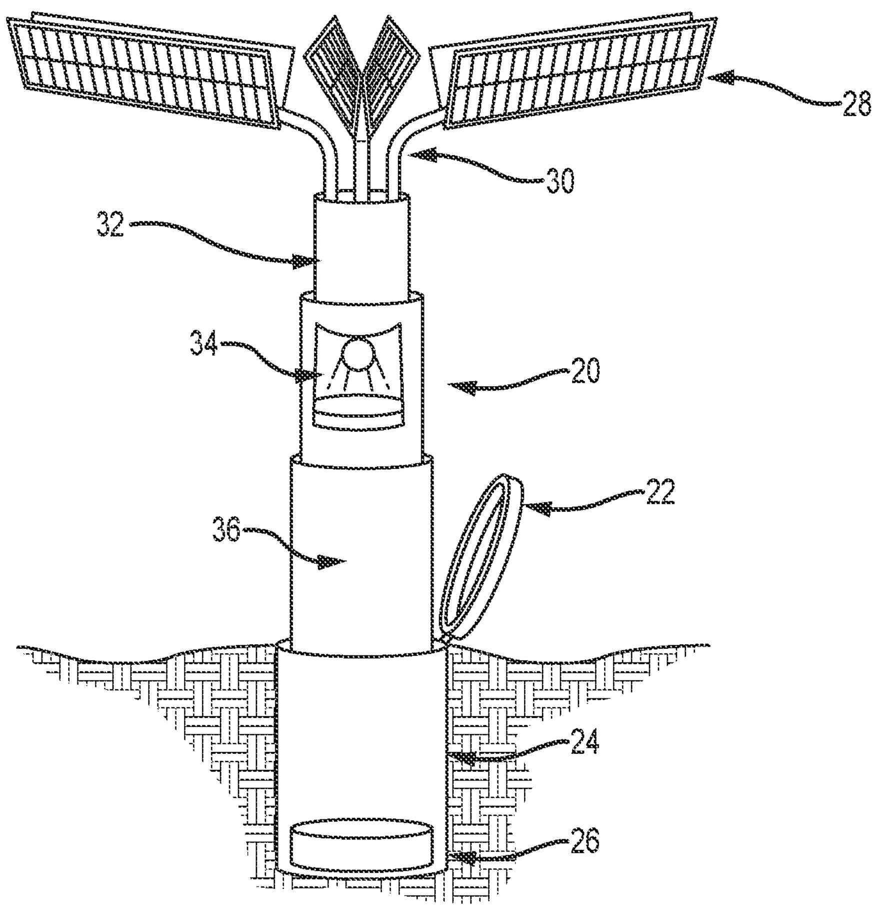

FIG. 2 is an elevation view of a system according to one embodiment of the present disclosure.

Figure 3:
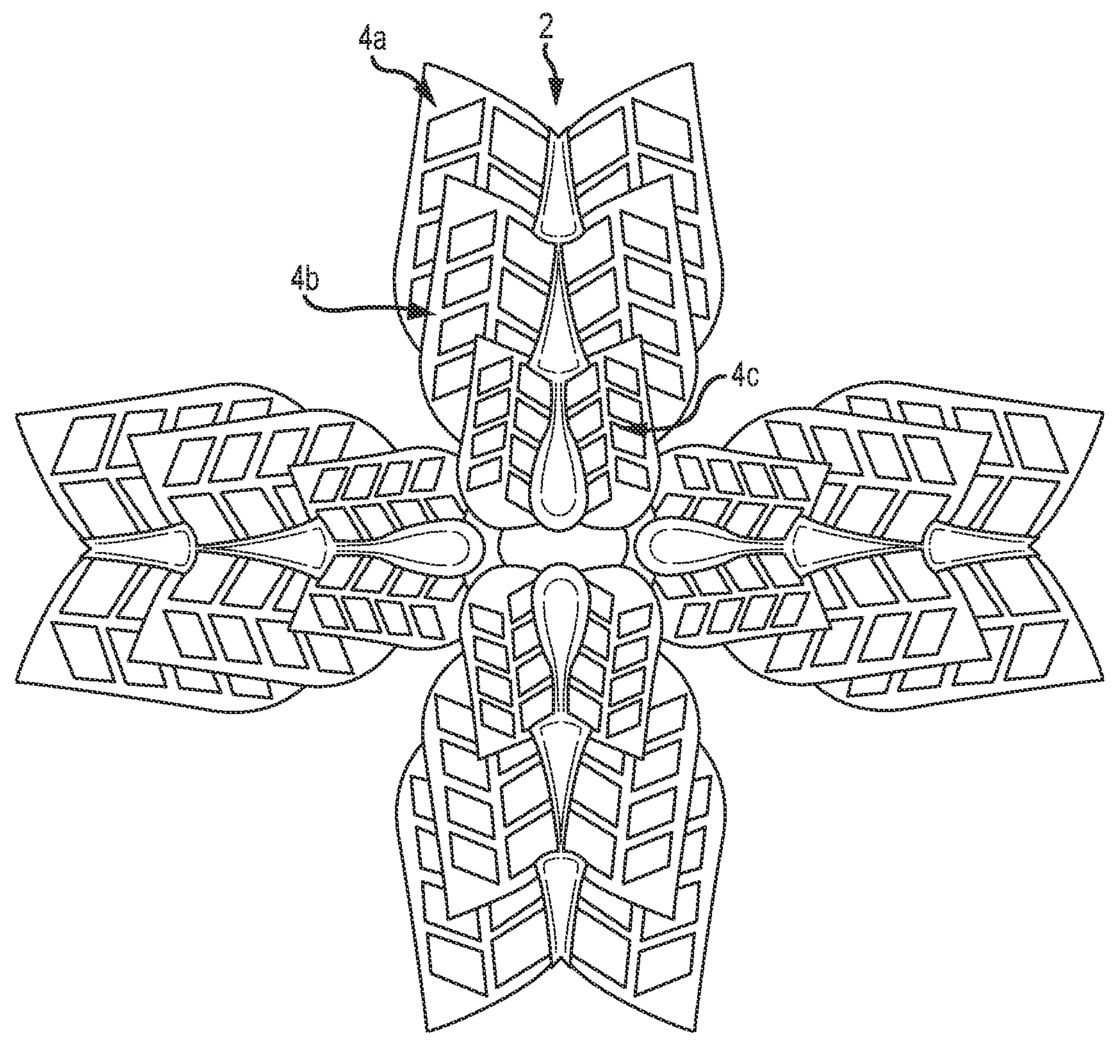

FIG. 3 is a top plan view of a system according to an embodiment of the present disclosure.

Figure 4:
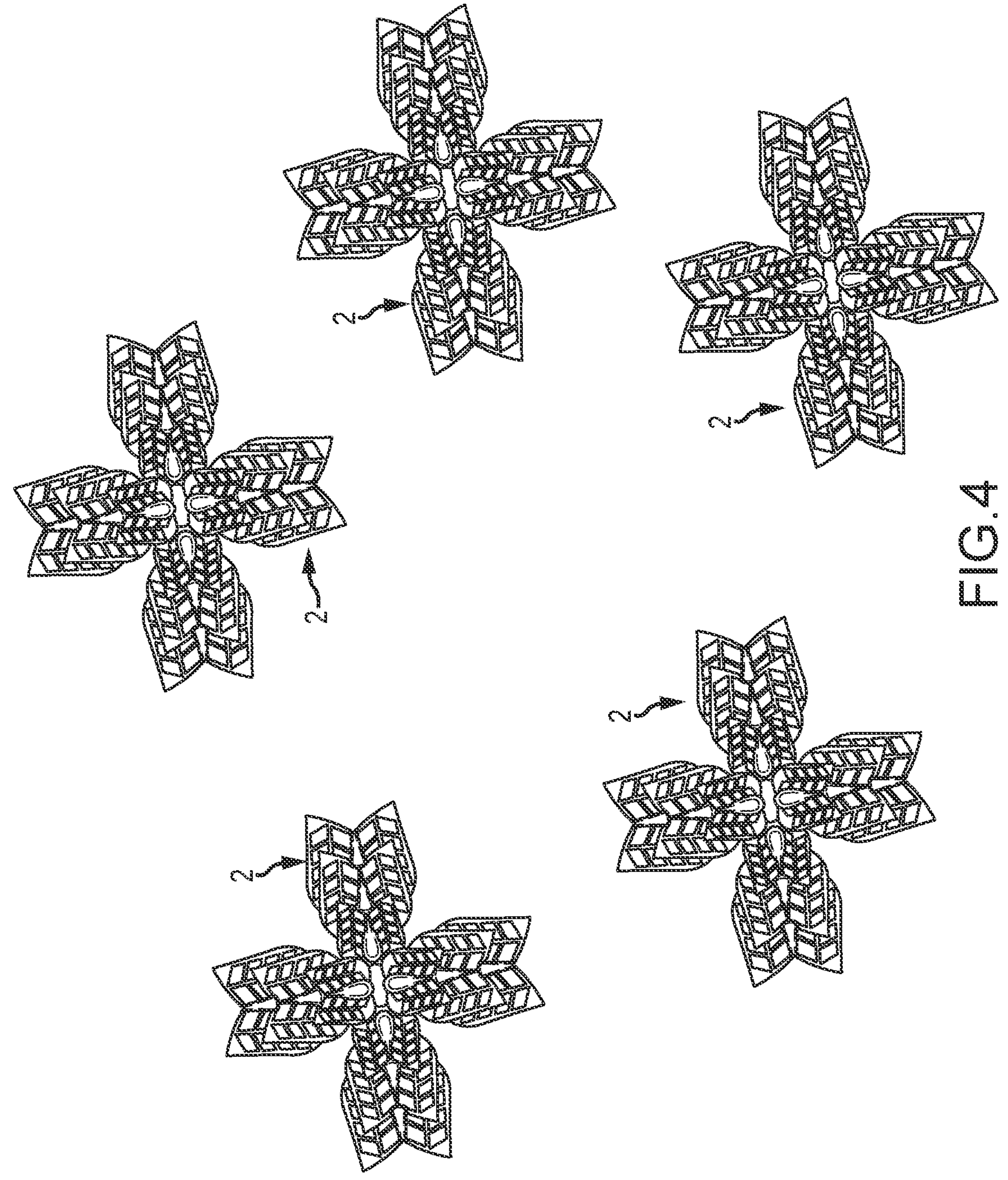

FIG. 4 is a top plan view of a plurality of deployed systems in accordance with embodiment of the present disclosure.

DETAILED DESCRIPTION

FIG. 1 is a front elevation view of a system 2 according to an embodiment of the present disclosure. As shown, the system 2 comprises a self-sustaining crop protection and management system that is operable to be deployed or installed in an agricultural setting. Systems of the present disclosure are not limited to any particular crop or agricultural application and are contemplated as being useful in various applications including, for example, conventional temperature zone agriculture (e.g. corn, soy, etc.), tropical shade-grown applications (e.g. coffee), and various other applications. It is also contemplated that embodiments and systems of the present disclosure are useful in non-agricultural applications.

As shown in FIG. 1, the system 2 comprises a central support or tower 6 having a height. A plurality of retractable and expandable photovoltaic elements 4*a*, 4*b*, 4*c*, 4*d* is provided at or proximal to an upper portion of the tower. The photovoltaic elements 4 provide various features and benefits. For example, in addition to producing electrical energy, the photovoltaic elements 4 are also operable to provide at least one of shade and physical protection from the elements such as hail, snow, torrential rain, etc. It is known that many photovoltaic panel members comprise significant impact resistance that is greater than that of crop and even many conventional covering or roofing materials. The energy-producing photovoltaics are thus provided as a means of producing green energy as well as physically protecting crops, soil 8, persons, etc.

The system 2 of FIG. 1 is operable to be installed by a variety of systems and methods. An anchor member 10 is shown. The anchor member 10 is contemplated as comprising a spike, a screw, or similar member to anchor and secure the system 2 to the soil or substrate 8. In some embodiments, the anchor member 10 comprises a moisture sensor that is operable to determine a moisture content of the substrate 8. The system 2 comprises additional sensors including, for example, a temperature sensor 16 for determining ambient air temperature. Additional sensors including, for example, an anemometer, a barometer, a UV sensor, and a precipitation sensor are contemplated as being integrated into the system 2.

Although not shown in FIG. 1, the system is contemplated as comprising a controller that is operable to receive information from one or more sensors provided in combination with this system. Information received by the controller and sensors may be communicated to a user and/or may automatically control the operation of the photovoltaic member 4. For example, when one or more sensors of the present disclosure determine that environmental conditions are characterized by high UV and elevated temperatures, the photovoltaics 4 are automatically deployed or extended to provide shade to crops and simultaneously produce clean energy. Similarly, if the substrate 8 comprises sufficient moisture and/or heavy rains are detected, the photovoltaics 4 may also be deployed to protect crops and gather and collect rainwater for future use (e.g. when conditions are drier).

As further shown in FIG. 1, systems 2 of the present disclosure are contemplated as comprising one or more insect traps 12. The trap 12 of FIG. 1 is shown as comprising an attractant 14, which may comprise a light or similar element, and a trap such as a stored liquid to trap and destroy pests. Additionally, a particle counter or similar sensor for counting and tracking pests is contemplated as being provided.

The system 2 of FIG. 1 contemplates one or more on-board liquid collection and storage compartments. An outlet, such as a spigot 18 or similar feature is provided to allow for selective egress and distribution of collection liquid (e.g. rainwater). In some embodiments, systems of the present disclosure comprise irrigation systems including, for example, pumps, nozzle, spray heads, etc. to advantageously distribute collected liquids over an area.

FIG. 2 is a front elevation view of a system according to another embodiment of the present disclosure. As shown, the system comprises a telescoping tower 20 comprising multiple sections. The telescoping tower is contemplated as being fully retractable, meaning that the contemplated tower can be provided subgrade as may be useful and desirable in certain conditions such as crop harvesting. The system comprises one or more photovoltaic members 28 provided on moveable or flexible supports 30 that are both capable of being moved and retracted into the tower 20. The flexible supports 30 are contemplated as comprising bendable PVC and/or polycarbonate members. One or more motors or piezoelectric members are contemplated as being provided to manipulate the supports 30. Multiple sections 28, 30, 32, 34, 36 are contemplated as being fully retractable into a base unit 24. The base unit 24 comprises a subgrade base unit with a rotatable lid or cover 22 at or just below ground level. The lid 22 is operable to protect and secure stowed elements from environmental conditions, harvesting equipment, etc. As shown and described with respect to FIG. 1, the embodiment of FIG. 2 is also contemplated as comprising one or more sensors to control features of the system. For example, it is contemplated that a temperature sensor is provided on the lid 22 and connected to a controller to automatically and selectively open the lid 22 and extend or deploy components when their use is desired.

In the embodiment of FIG. 2, a battery module 26 is provided in the base 24 and is operable to supply and receive power from the system. Current generated by the photovoltaic(s) 28 is contemplated as being conveyed to the battery module 26 and/or remote locations for storage and use.

The embodiment of FIG. 2 further comprises a pest trap 34 operable to attract, destroy, and/or count various pests. Additionally, one or more sections of the tower are contemplated as comprising water storage to selectively collect, house, and distribute collected water.

FIG. 3 is a top plan view of a system 2 deployed in an agricultural setting, for example. As shown, a plurality of retractable photovoltaics 4*a*, 4*b*, 4*c* are provided that are operable to extend over an area such as crop field. No limitation with respect to the number, size, shape, or arrangement of panels is provided. For example, conventional rectilinear solar panels are contemplated as being provided in addition to or in lieu of the leaf-shaped panels of FIG. 3.

FIG. 4 is a top plan view of a plurality of systems 2 provided in an installed and dispersed arrangement. While five systems are shown in FIG. 4, it will be recognized that no limitation with respect to a number of systems that can be installed is provided. The number is contemplated as increasing or decreasing based on the land area involved, a desired amount of shade and protection, local environmental conditions, crop type, budget, etc.

Various features and embodiments of an environmental management and protection system have been provided herein. It will be recognized, however, that various features are not necessarily specific to certain embodiments and may be provided on any one or more embodiments. The present disclosure and embodiments provided herein are not mutually exclusive and may be combined, substituted, and omitted. The scope of the invention(s) provided herein is thus not limited to any particular embodiment, drawing, or particular arrangement of features.

While various embodiments of the present disclosure have been described in detail, it is apparent that modifications and alterations of those embodiments will occur to those skilled in the art. However, it is to be expressly understood that such modifications and alterations are within the scope and spirit of the present disclosure. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A self-contained system for shading and environmental conditions management, the self-contained system comprising:

a base operable to be provided at least partially within a substrate, wherein the base includes an anchor member operable to secure the system to the substrate and the anchor member includes a moisture sensor;

a central support member comprising a height fully telescopically retractable into the base, such that a narrowing of the central support member occurs from the base along the height, wherein the telescopic retractability is effectuated electronically;

a photovoltaic array comprising a plurality of retractable and expandable photovoltaic elements provided at or proximal to an upper portion of the central support member, wherein the photovoltaic elements are operable to provide protection for agriculture, to produce electrical energy, and to at least partially retract into at least one of the central support member and the base;

a fluid storage vessel disposed within the central support member configured to receive and house collected precipitation;

a pest mitigation system disposed within the central support member, comprising an attractor element and a trap element, wherein the attractor element comprises an ultraviolet light in electrical communication with the photovoltaic array;

a sensor operable to determine at least one of: ambient air temperature, humidity, moisture content of the substrate, light intensity, precipitation type, precipitation rate, barometric pressure, and wind speed;

a controller operable to receive information from the sensor and operable to at least one of retract and expand a photovoltaic element of the photovoltaic array;

a lid operable to seal the base after at least the central support member, photovoltaic array, pest mitigation system, sensor, controller, and rechargeable battery module are retracted into the base; and a rechargeable battery pack operable to convey power to at least one of the photovoltaic array, the sensor, the pest mitigation system, and the controller, wherein the rechargeable battery module is further operable to receive current from the photovoltaic array, and wherein the system comprises at least one of machine learning and artificial intelligence features operable to operate anticipatory actions, estimate crop survival, optimize yield, or control pests.

2. The system of claim 1, wherein the photovoltaic array comprises a plurality of overlapping photovoltaic panels that are individually outwardly extendable, retractable, and configurable with respect to at least one of one another and the central support member, wherein at least one of the panels comprise a V-shape.

3. The system of claim 1, wherein the photovoltaic array comprises a motorized track member operable to retract and extend the photovoltaic array as a whole or individual panels thereof.

4. The system of claim 1, wherein the controller is operable to automatically extend at least one photovoltaic panel member to provide at least one of shade and shelter to the surrounding area in response to information received from the sensor relating to changes in at least one of light intensity, ambient air temperature, precipitation type, precipitation rate, barometric pressure, and wind speed.

5. The system of claim 1, wherein the lid comprises a temperature sensor in operational communication with the controller to automatically open the lid and extend components of the system.

6. The system of claim 1, further comprising an outlet operationally engaged with the fluid storage vessel to selectively distribute collected fluids.

7. A self-contained system for shading and environmental conditions management, the self-contained system comprising:

a base, wherein the base is provided at least partially within a substrate and includes an anchor member operable to secure the system to the substrate and the anchor member includes a moisture sensor;

a central support member comprising a height fully telescopically retractable into the base, such that a narrowing of the central support member occurs from the base along the height, wherein the telescopic retractability is effectuated electronically;

a photovoltaic array comprising a plurality of retractable and expandable photovoltaic elements provided at or proximal to an upper portion of the central support member, wherein the photovoltaic elements are operable to provide protection for agriculture, to produce electrical energy, and to at least partially retract into at least one of the central support member and the base;

a storage vessel disposed within the central support member configured to receive and house collected precipitation;

a pest mitigation system disposed within the central support member, comprising an attractor element and a trap element;

a sensor operable to determine temperature and at least one of: humidity, moisture content of the substrate, light intensity, precipitation type, precipitation rate, barometric pressure, and wind speed;

a controller operable to receive information from the sensor and operable to at least one of retract and expand a photovoltaic element of the photovoltaic array;

a rechargeable battery module operable to convey power to at least one of the photovoltaic array, the sensor, and the controller, wherein the rechargeable battery module is further operable to receive current from the photovoltaic array; and a lid operable to seal the base after at least the central support member, photovoltaic array, sensor, controller, and rechargeable battery module are retracted into the base, wherein the system comprises at least one of machine learning and artificial intelligence features operable to operate anticipatory actions, estimate crop survival, or optimize yield.

8. The system of claim 7, wherein the attractor element comprises an ultraviolet light in electrical communication with the photovoltaic array, and wherein the ultraviolet light is operable to be maintained in an active state for an extended period of time.

9. The system of claim 7, wherein the photovoltaic array comprises a plurality of overlapping photovoltaic panels that are individually outwardly extendable, retractable, and configurable with respect to at least one of one another and the central support member, wherein at least one of the panels is configurable into a V-shape.

10. The system of claim 7, wherein the photovoltaic array comprises a motorized track member operable to retract and extend the photovoltaic array as a whole or individual panels thereof.

11. The system of claim 7, wherein the controller is operable to automatically extend at least one photovoltaic panel member to provide at least one of shade and shelter to the surrounding area in response to information received from the sensor relating to at least one of light intensity, ambient air temperature, precipitation type, precipitation rate, barometric pressure, and windspeed.

12. The system of claim 7, wherein the lid comprises a temperature sensor in operational communication with the controller to automatically selectively open the lid and extend components of the system.

13. The system of claim 7, further comprising an outlet operationally engaged with the fluid storage vessel to selectively distribute collected fluids.

14. A self-contained system for shading and environmental conditions management, the self-contained system comprising:

a base provided at least partially within a substrate, wherein the base includes an anchor member operable to secure the system to the substrate and the anchor member includes a moisture sensor;

a central support member comprising a height fully telescopically retractable into the base, such that a narrowing of the central support member occurs from the base along the height, wherein the telescopic retractability is effectuated electronically;

a photovoltaic array comprising a plurality of retractable and expandable photovoltaic elements provided at or proximal to an upper portion of the central support member, wherein the photovoltaic elements are operable to provide protection for agriculture, to produce electrical energy, and to at least partially retract into at least one of the central support member and the base;

a fluid storage vessel disposed within the central support member configured to receive and house collected precipitation;

a pest mitigation system disposed within the central support member, comprising an attractor element and a trap element, wherein the attractor element comprises an ultraviolet light;

a sensor operable to determine at least one of: ambient air temperature, humidity, moisture content of the substrate, light intensity, precipitation type, precipitation rate, barometric pressure, and wind speed;

a controller operable to receive information from the sensor and operable to at least one of retract and expand a photovoltaic element of the photovoltaic array;

a rechargeable battery operable to convey power to at least one of the photovoltaic array, the sensor, the pest mitigation system, and the controller, wherein the rechargeable battery is further operable to receive current from the photovoltaic array; and a lid operable to seal the base after at least the central support member, photovoltaic array, pest mitigation system, sensor, controller, and rechargeable battery module are retracted into the base, wherein the system comprises a controller operable to execute anticipatory actions, estimate crop survival, optimize yield, or control pests.

15. The system of claim 14, wherein the sensor is operable to determine ambient temperature and at least one of humidity, moisture content of the substrate, light intensity, precipitation type, precipitation rate, barometric pressure, and wind speed.

16. The system of claim 14, wherein the photovoltaic array comprises a plurality of overlapping photovoltaic panels that are individually outwardly extendable, retractable, and configurable with respect to at least one of one another and the central support member, wherein at least one of the panels comprises a V-shape.

17. The system of claim 14, wherein the photovoltaic array comprises a motorized track member operable to retract and extend the photovoltaic array as a whole or individual panels thereof.

18. The system of claim 14, wherein the controller is operable to automatically extend at least one photovoltaic panel member to provide at least one of shade and shelter to the surrounding area in response to information received from the sensor relating to at least one of light intensity, ambient air temperature, precipitation type, precipitation rate, barometric pressure, and wind speed, and wherein the system is operable to collect and gather data related to its own operations then learn to initiate and control at least one of further functions and actions based on past responses to external stimuli and information received from the sensor.

19. The system of claim 14, wherein the lid comprises a temperature sensor in operational communication with the controller to automatically selectively open the lid and extend components of the system, and wherein the system is operable to collect and gather data related to its own operations then learn to initiate and control at least one of further functions and actions based on past responses to external stimuli and information received from the sensor.

20. The system of claim 14, further comprising an outlet operationally engaged with the fluid storage vessel to selectively distribute collected fluids.

* * * * *